United States Patent
Selmeczi

[11] 3,914,378
[45] Oct. 21, 1975

[54] PROCESS FOR WET SCRUBBING OF SULFUR DIOXIDE FROM FLUE GAS

[75] Inventor: Joseph G. Selmeczi, Pittsburgh, Pa.

[73] Assignee: Dravo Corporation, Pittsburgh, Pa.

[22] Filed: Mar. 13, 1974

[21] Appl. No.: 450,752

Related U.S. Application Data

[63] Continuation-in-part of Ser. No. 359,777, May 14, 1973.

[52] U.S. Cl. ............................................. 423/242
[51] Int. Cl.² ........................................ C01B 17/00
[58] Field of Search .................................. 423/242

[56] References Cited
UNITED STATES PATENTS

| | | |
|---|---|---|
| 2,113,198 | 4/1938 | Nonhebel et al. ................... 423/242 |
| 3,520,649 | 7/1970 | Tomany et al. ..................... 423/242 |
| 3,615,199 | 10/1971 | Terrana et al. ..................... 423/242 |

Primary Examiner—Oscar R. Vertiz
Assistant Examiner—Eugene T. Wheelock
Attorney, Agent, or Firm—Parmelee, Miller, Welsh & Kratz

[57] ABSTRACT

A process for removing sulfur dioxide from flue gas by a wet scrubbing system having a demister unit and wherein addition of a specified amount of magnesium ion to the lime scrubbing slurry is made, with the thickener overflow used as demister water without substantial scaling or solid deposition. A resultant higher efficiency of the scrubber is achieved with fresh water added to the system usable to slake the lime-magnesium slurry used to replenish the scrubbing liquor.

4 Claims, 1 Drawing Figure

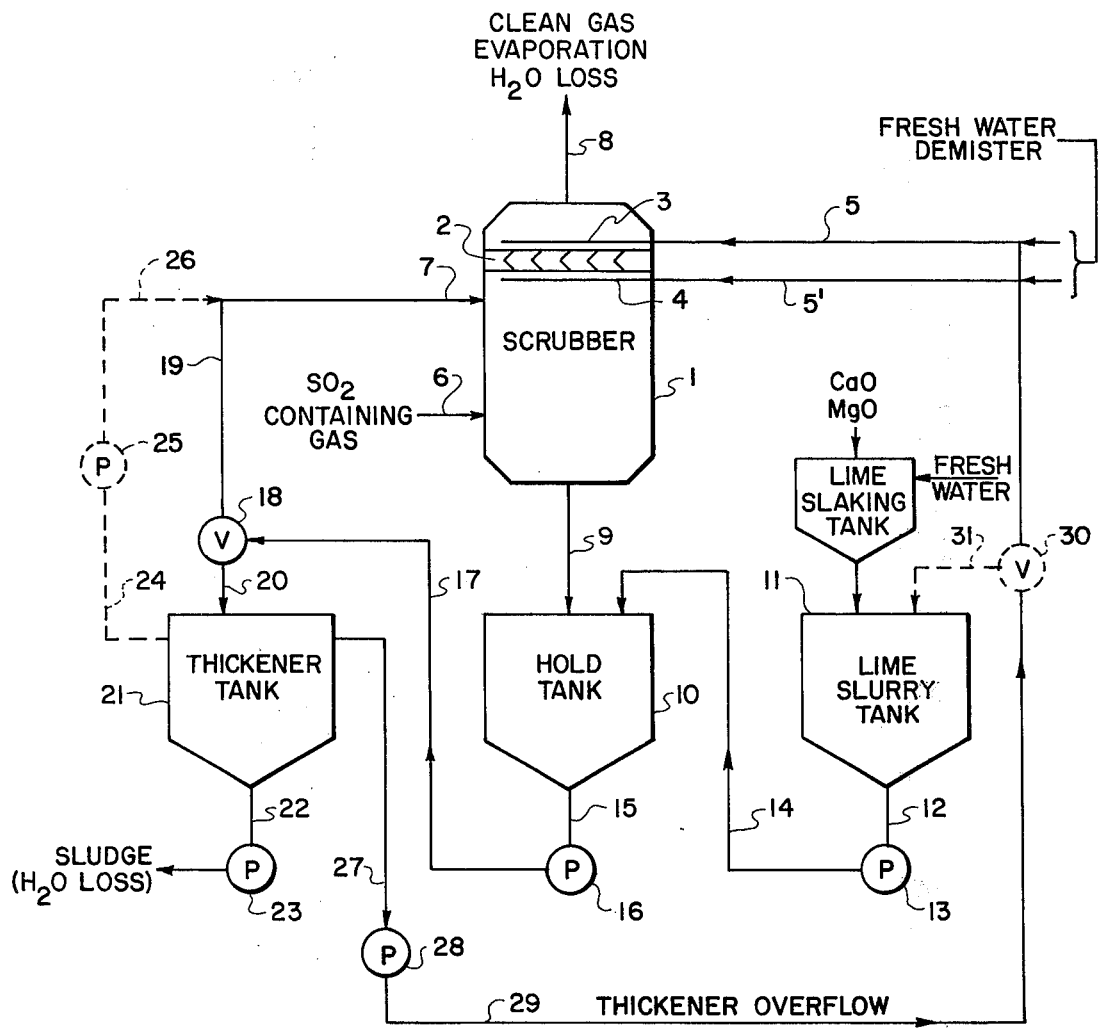

PROCESS FOR WET SCRUBBING OF SULFUR DIOXIDE FROM FLUE GAS

CROSS-REFERENCE TO RELATED APPLICATION

This application is a continuation-in-part of application Ser. No. 359,777 filed by the inventor herein on May 14, 1973, and entitled "Process for the Removal of Oxides of Sulfur from a Gaseous Stream".

BACKGROUND OF THE INVENTION

In processes for removing sulfur dioxide from gaseous streams, resulting from combustion of sulfur-containing coal, the gaseous stream is contacted in a wet scrubbing unit with an aqueous solution of calcium oxide or hydroxide. The calcium oxide may be in the form of a dissolved component or a suspended component in an aqueous slurry. The calcium-containing aqueous solution, upon contact with the gaseous stream, results in chemical reaction between the calcium oxide or hydroxide and sulfur dioxide to form predominantly calcium sulfite and calcium sulfate. The spent liquor is discharged from the scrubbing unit and additional calcium oxide slurry added thereto, preferably in a delay tank. The liquor so produced is then apportioned, one portion thereof being recycled to the wet scrubbing unit for further reaction with sulfur dioxide and a further portion thereof is passed to a thickener tank wherein solid salts of calcium are permitted to settle. The settling of the calcium salts produces an aqueous sludge which is then discharged from the system.

In such wet scrubbing systems, a demister unit is generally provided, these units usually constituting a series of spaced plates which form a tortuous path through which the gaseous stream must pass, following contact with the aqueous calcium-containing solution, so as to effect removal of entrained water droplets, which droplets may contain solid matter. The gaseous stream is then directed from the wet scrubber for subsequent discharge to the atmosphere. The demister unit is usually washed or sprayed by water to maintain the plates thereof free from solids buildup which would result in plugging.

In addition to the water that is used to wash the demister unit, it is desired to use fresh water to slake the calcium oxide (lime) which is used to replenish calcium oxide lost from the scrubbing liquor during the scrubbing process in the formation of sulfur salts of calcium. Fresh water is preferred for slaking because of the improved dispersion of calcium hydroxide in clean water as opposed to polluted water. Upon slaking of the calcium oxide, less pure water may be used for dilution in forming the slurry to be used in scrubbing.

A problem exists relative to using fresh water for demister wash and for lime slaking, however, in that addition of more water than that which is normally lost during operation of the scrubber causes dilution of the scrubbing liquor and resultant lower efficiency in scrubber operation as well as an increased volume or throughput of aqueous medium over and above that normally desired.

The loss of water in the scrubbing system generally is concentrated in two areas, that which is lost by evaporation and carried from the system by hot gases discharged from the scrubber and that which is lost by removal of the sludge formed in the thickener.

I have discovered that in using about 250–5000 parts per million of magnesium ion in the calcium oxide scrubbing liquor, the calcium ion content of water from the thickener overflow is kept below a value which would cause precipitation of calcium salts from the thickener overflow so that the thickener overflow can be used as wash water in the demister and fresh water to be added to the system may be used for slaking of the lime-magnesium slurry.

BRIEF SUMMARY OF THE INVENTION

Sulfur dioxide is removed from a gaseous stream by a wet scrubbing system having a demister unit and a thickener unit, the system using a scrubbing aqueous liquor containing calcium oxide or hydroxide and 250–5000 parts per million of magnesium ion concentration. The effluent from the scrubber is enriched with calcium or magnesium components and apportioned with one portion returned to the scrubber and a second portion passed to a thickener unit where solid salts are precipitated in the form of a removable slurry. The clarified overflow from the thickener is directed to the demister for use therein as demister water, without problems of plugging or scaling in the demister. A portion of the thickener overflow may also be used to slurry additional calcium and magnesium components, if desired.

DESCRIPTION OF THE DRAWING

The drawing is a schematic illustration of the process of the present invention wherein thickener overflow water is used as demister water, with apparatus schematically illustrated for carrying out the process.

DETAILED DESCRIPTION

In certain processes for removing sulfur dioxide from flue gas streams, an aqueous liquor containing dissolved and suspended calcium hydroxide or calcium oxide, generally termed a lime slurry, is contacted with the gaseous stream within a wet scrubbing system. The contact is effected in a wet scrubbing unit wherein the gaseous stream is passed countercurrently to the lime slurry, the gaseous stream then passing through a demister unit and finally discharged to the atmosphere, with the final sulfur dioxide content thereof acceptable to environmental controls.

In application Ser. No. 359,777, filed by the inventor herein on May 14, 1973, and entitled "Process for the Removal of Oxides of Sulfur from a Gaseous Stream", which application is incorporated by reference herein, an improved wet scrubbing process is disclosed providing for the incorporation of 250–5000 parts per million of magnesium ion content in the calcium salt-containing aqueous liquor within the scrubbing unit. As disclosed therein, the addition of this amount of magnesium ion increases the alkalinity of the liquor and increases the efficiency of the sulfur dioxide removal system.

The present invention, which is an improvement over the invention described in the above-identified application, provides for the use of the thickener overflow water in the demister, a use which has previously been undesirable because of the problem of clogging or plugging of the demister by calcium salt components present in the overflow.

Referring to the attached drawing, a wet scrubbing unit 1 is provided which may be of conventional design, such as a venturi-type wet scrubbing unit, having a demister unit 2. The demister unit is normally washed or sprayed with water from a spray device 3 from an overhead position and also may be washed with a further spray device 4 located therebelow. Water for the spray devices is provided through a conduit or pair of conduits 5 and 5', the source of the water, if fresh water were to be used, not being shown on the drawing. A gaseous stream containing sulfur dioxide such as that resulting from the combustion of sulfur-containing coal, is introduced into the wet scrubbing unit 1 as shown at 6, while a calcium-salt containing liquor containing the requisite amount of magnesium ion is introduced into the wet scrubbing unit at 7. After contact of the gaseous stream with the scrubbing liquor, with resultant removal of sulfur dioxide therefrom, the gaseous stream is passed through the demister unit 2, wherein entrained solid particles and water droplets are removed, and then discharged from the scrubbing unit as a clean gas stream 8. The clean gas stream 8, because of its heated state, will carry water in evaporated state therewith, which evaporative loss results in loss of water from the scrubbing system. The effluent liquor from the scrubber unit 1 is discharged therefrom, following contact with the gaseous stream by means of line 9 and directed to a delay or hold tank 10. Also added to hold tank 10, for admixture with the effluent liquor is fresh aqueous lime slurry containing the requisite amount of magnesium ion content, the lime, calcium oxide, and magnesium ion component, preferably magnesium hydroxide, being formed into an aqueous slurry in lime slurry tank 11. The slurry tank 11 is charged with an aqueous slaked mixture prepared in a lime slaking tank, and the slurry formed therein discharged through line 12 and pumped by pump 13 through line 14 into the hold tank 10. From hold tank 10, the aqueous liquor is passed by line 15 to pump 16 and pumped through line 17 to a valve 18, the valve apportioning the aqueous liquor into two portions. One portion of the aqueous liquor, containing calcium salts, calcium oxide or hydroxide and a magnesium ion content is recycled to the scrubber unit through line 19 for further contact with sulfur dioxide-containing gases. A further portion of the aqueous liquor is directed through line 20 to a solid-liquid separator or thickener tank 21. In the thickener tank 21, salts such as carbonates, sulfites, and sulfates precipitate from the aqueous liquor to form an aqueous sludge, which sludge is discharged through line 22 and pumped by means of pump 23 for disposal or other use. The aqueous sludge also, upon discharge from the thickener, results in loss of water from the system, the water content of the sludge generally being about 50–70% based upon the weight of the sludge discharged. A portion of clarified aqueous liquor formed in the thickener tank may, if desired, be returned by means of line 24, pump 25 and line 26 to the aqueous portion fed to the scrubbing unit through line 19.

In the present invention, the clarified liquor or a major portion thereof is discharged from the thickener tank through line 27 and, by means of pump 28, directed to the conduits 5 and 5' which serve to direct the thickener overflow to the spray nozzles 3 and 4 for use as demister water.

The use of the magnesium ion containing aqueous liquor results in a thickener overflow which will be low in scaleforming components such as sulfur salts of calcium, that is, a calcium ion content of below about 200 parts per million which enables the use of this thickener overflow in a demisting operation without producing a scale or otherwise plugging the demister unit. Thus, fresh water added to the system may be used to slake the lime although, as indicated, a valve 30 may optionally be provided in line 29 to direct a portion of the thickener overflow, if desired, by means of line 31 to the lime slurry tank 11.

As an example of the amount of water used in wet scrubbing of flue gases from a power plant, generally, in use with a 100 megawatt power plant burning about 3.5% sulfur coal, with a resultant 300,000 cubic feet per minute of sulfur dioxide containing flue gas which is passed through a wet scrubber, the loss of water through evaporative mist from the scrubber, such as at 8 in the drawing, would amount to about 200 pounds/minute, while water lost in the sludge from the thickener tank 9, where the sludge is about 40% solids and 60% water, would amount to about 500 pounds/minute. During the wet scrubbing process, however, the fresh water added to the lime slurry tank 11 to slake the calcium oxide and magnesium oxide added thereto amounts to about 700 pounds/minute. Water used in the demister, depending upon the degree of washing, can amount to between about 500–2000 pounds/minute. As can be seen by offsetting the amount of water lost from the system versus the amount of water required for lime slaking and demisting, the use of completely fresh water for the latter two operations will result in an over-dilution within the system and resultant lower efficiency. It can be seen, therefore, that by the use of thickener overflow water in the demister, the addition of fresh water to the system can be limited to that used for lime slaking so that the over-all balance of the system is maintained, while the thickener overflow water will not plug or otherwise interfere with the demister operation.

I claim:

1. In a process for removing sulfur dioxide from a gaseous stream in a wet scrubbing unit having a contact zone and means for demisting the gaseous stream wherein the gaseous stream is contacted with an aqueous liquor containing calcium salts and a magnesium ion content of about 250-5000 parts per million, and wherein a portion of the aqueous effluent is recycled to the scrubbing unit while a further portion thereof is passed to a thickener unit to precipitate salts therefrom and produce a clarified thickener overflow, the improvement comprising passing the clarified thickener overflow from the thickener unit to said means for demisting the gaseous stream, and directing said clarified thickener overflow onto said means for demisting the gaseous stream to wash the same and prevent solids buildup thereon.

2. In the process defined in claim 1, the improvement wherein the sole supply of water fed to said demister comprises said clarified thickener overflow.

3. In the process defined in claim 1, the improvement wherein said clarified thickener overflow water is apportioned and one portion directed to the underside of said means for demisting the gaseous stream and a second portion is directed to the upper side thereof.

4. In the process defined in claim 1, the improvement wherein a portion of said clarified thickener overflow is directed to a slurry tank for use in dilution of the slaked calcium and magnesium hydroxides for use in said scrubbing liquor.

* * * * *